(12) United States Patent
Krishnan et al.

(10) Patent No.: US 12,441,898 B2
(45) Date of Patent: Oct. 14, 2025

(54) VISCOSITY MODIFIERS FOR ENERGY CURABLE INKS

(71) Applicant: Sun Chemical Corporation, Parsippany, NJ (US)

(72) Inventors: Ramasamy Krishnan, Carlstadt, NJ (US); David Klein, Carlstadt, NJ (US); Ilca Webster, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/874,054

(22) PCT Filed: Jul. 18, 2023

(86) PCT No.: PCT/US2023/028038
§ 371 (c)(1),
(2) Date: Dec. 11, 2024

(87) PCT Pub. No.: WO2024/020037
PCT Pub. Date: Jan. 25, 2024

(65) Prior Publication Data
US 2025/0163285 A1    May 22, 2025

Related U.S. Application Data

(60) Provisional application No. 63/391,085, filed on Jul. 21, 2022.

(51) Int. Cl.
*C09D 11/101* (2014.01)
*C09D 11/033* (2014.01)
*C09D 11/037* (2014.01)

(52) U.S. Cl.
CPC ........ *C09D 11/101* (2013.01); *C09D 11/033* (2013.01); *C09D 11/037* (2013.01)

(58) Field of Classification Search
None
See application file for complete search history.

(56) References Cited

U.S. PATENT DOCUMENTS 8,816,012 B2 * 8/2014 Brown ............... C08F 222/102
525/308
2012/0042694 A1    2/2012 Brown

FOREIGN PATENT DOCUMENTS

| CN | 1848303 A | 10/2006 |
|---|---|---|
| CN | 108517146 A | 9/2018 |
| JP | 2003107701 A | 4/2003 |

(Continued)

OTHER PUBLICATIONS

International Search Report issued in International Application No. PCT/US2023/028038, mailed Oct. 19, 2023.

(Continued)

*Primary Examiner* — Sanza L. McClendon
(74) *Attorney, Agent, or Firm* — Marian E. Fundytus; Amster Rothstein & Ebenstein LLP

(57) ABSTRACT

The present invention provides energy curable thixotropic compositions comprising low amounts of 2,2,4-trimethyl-1,3-pentanediol isobutyrate (Texanol); 2,2,4-trimethyl-1,3-pentanediol diisobutyrate (TXIB); or dipropylene glycol butyl ether (DPGBE mixes isomers), or combinations thereof. The addition of the selected solvents in amounts of about 0.5 wt % to 3 wt % reduced the low shear rate viscosity of the energy curable thixotropic compositions.

14 Claims, 3 Drawing Sheets

(56) References Cited

FOREIGN PATENT DOCUMENTS

| | | |
|---|---|---|
| JP | 2019-168654 A | 10/2019 |
| WO | WO03010250 A1 | 2/2003 |
| WO | WO2009/097142 A1 | 8/2009 |

OTHER PUBLICATIONS

Written Opinion of the International Searching Authority issued in International Application No. PCT/US2023/028038, mailed Oct. 19, 2023.
International Preliminary Report on Patentability (Chapter II of the Patent Cooperation Treaty) issued in International Application No. PCT/US2023/028038, mailed Dec. 2, 2024.
Phung and colleagues (Phung et al. (2023). A study of UV-curable offset ink emulsified with an alternative isopropyl alcohol-free fountain solution. Journal of Applied Science and Engineering, vol. 27, No. 1, p. 1867-1876).
The Printing Ink Manual, Fifth Edition, pp. 641-642, editors: R.H. Leach, RJ. Pierce, E.P. Hickman, M.J. Mackenzie, H.G. Smith.

* cited by examiner

VISCOSITY MODIFIERS FOR ENERGY CURABLE INKS

CROSS REFERENCE TO RELATED APPLICATIONS

The present application is a § 371 National Phase application based on PCT/US2023/028038 filed Jul. 18, 2023, which claims the benefit of U.S. Provisional Application No. 63/391,085, filed Jul. 21, 2022, the subject matter of each of which is incorporated by reference in their entirety.

FIELD OF THE INVENTION

The present invention is related to energy curable thixotropic compositions having low shear rate viscosity, and to a method of adjusting the viscosity of energy curable thixotropic inks and coatings. By reducing low shear viscosity, the flow and printability of the inks and coatings is improved.

BACKGROUND OF THE INVENTION

Printing inks are designed to work best when used at a certain viscosity. The ideal viscosity is highly dependent on the type of printing. For example, lithographic inks are typically of relatively high viscosity and thixotropy, while flexographic inks are typically much lower viscosity and thixotropy. Thixotropy is a property well known to printers and ink formulators, and refers to viscous or gelled material that will flow when agitated or shear stressed, but subsequently reverts to a viscous or gelled material once the agitation or shear stress stops.

Certain pigments are notorious for producing highly viscous inks at low shear rates, resulting in difficulty in handling and printing (e.g. difficult to pump into the anilox chamber of a flexographic printing press). The inventors have discovered a way to lower the viscosity of these inks at low shear rates, making them much more user friendly in terms of handleability and ease of printing.

WO 2003/010250 (~ EP 1412441) discloses water-based energy curable ink compositions. Although texanol is included in a list of optional additives, there is no further explanation, examples or data regarding texanol.

JP 2019-168654 discloses alkali-developable photosensitive compositions comprising a novel oxime ester photoinitiator. Solvents may optionally be added. The list of optional solvents includes texanol, but the list is long, and there is no further explanation, examples or data regarding texanol.

WO 2009/097142 (~EP 2245075) is directed to low volatile content (low VOC) coalescing agents. There is no mention of UV-curable compositions, and the reference discourages the use of Texanol.

Phung and colleagues (Phung et al. (2023). A study of UV-curable offset ink emulsified with an alternative isopropyl alcohol-free fountain solution. Journal of Applied Science and Engineering, vol. 27, No. 1, page 1867-1876) disclose a fountain solution prepared using ethylene glycol mono-butyl ether (EGME) as a substitute for isopropyl alcohol (IPA). A minimum of 10% EGME was required to disperse the fountain solution in UV inks. No solvent was added to the actual ink composition.

The Printing Ink Manual discusses mentions that "selective use of non-curing solvent is possible in a UV vehicle formulation, but this practice is limited." The manual further describes the use of heated ducts and cylinders to lower viscosity. Also very low viscosity monomers are generally not used because of their volatility and toxicology (The Printing Ink Manual, Fifth Edition, pages 641-642, editors: R. H. Leach, R J. Pierce, E. P. Hickman, M. J. Mackenzie, H. G. Smith).

Citation or identification of any document in this application is not an admission that such represents prior art to the present invention.

BRIEF SUMMARY OF THE INVENTION

The present invention provides energy curable compositions comprising one or more high molecular weight, low volatile, solvents. Inclusion of the solvents surprisingly improves the viscosity and thixotropic properties of the energy curable inks.

In a particular aspect, the present invention provides an energy curable composition, comprising:
 (a) one or more ethylenically unsaturated monomers, or one or more ethylenically unsaturated oligomers, or combinations thereof; and
 (b) a solvent selected from the group consisting of: 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof.

In preferred embodiments, the solvent is present in an amount of about 0.5 wt % to about 3 wt %.

In some embodiments, the energy curable composition is a printing ink, coating, or pigment dispersion. In preferred embodiments, the composition is a flexographic ink.

In some embodiments, the viscosity of the energy curable composition comprising one or more of the solvents is reduced by equal to or greater than 25%, compared to a composition containing all of the same components except the solvent.

In another aspect, the present invention provides a method of reducing the viscosity of an energy curable composition, comprising:
 (a) providing an energy curable composition;
 (b) adding one or more solvent selected from the group consisting of: 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof.

The present invention also provides a printed or coated article comprising the composition of the present invention. In some embodiments, the article is a printed label.

These and other objects, advantages, and features of the invention will become apparent to those persons skilled in the art upon reading the details of the formulations and methods as more fully described below.

DETAILED DESCRIPTION OF THE INVENTION

Figure 1:
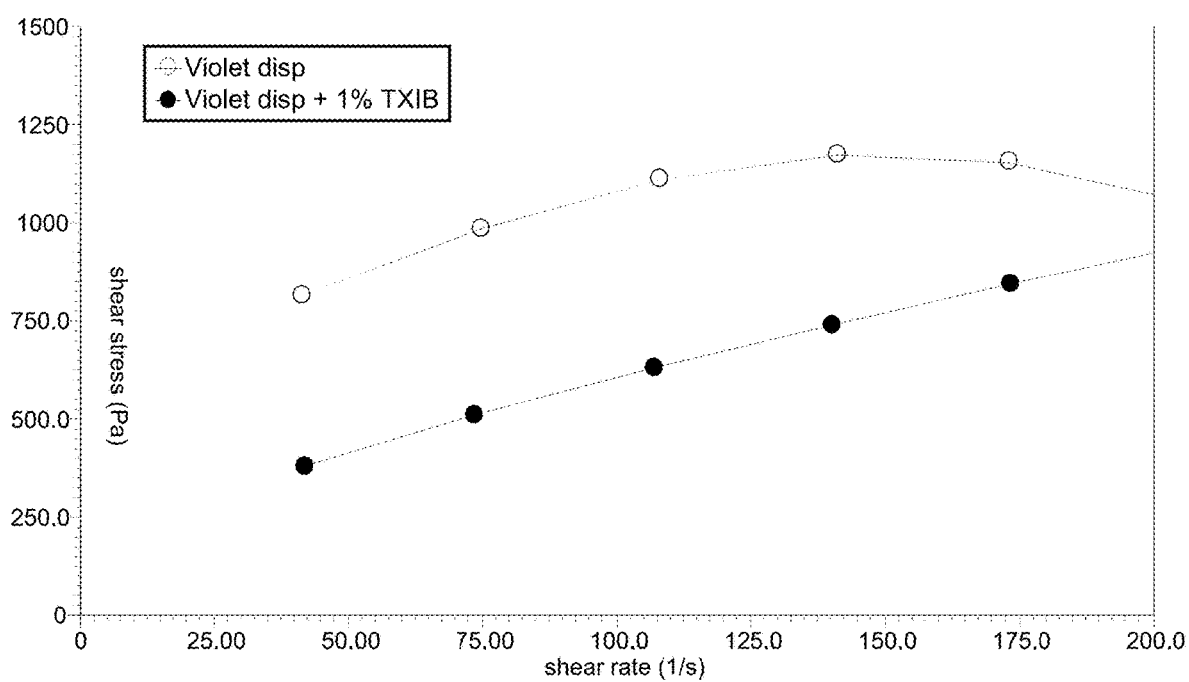
FIG. 1 illustrates the rheology curves for a violet dispersion, and the same violet dispersion modified with 1% TXIB, as described in Example 1.

It was surprisingly discovered that certain solvents are effective in reducing the thoixotropy and viscosity of energy curable inks, especially UV curing flexographic inks, to improve the flow and pumpability of the ink. Two such materials are the solvents 2,2,4-trimethyl-1,3-pentanediol monoisobutyrate (Texanol, Eastman), and 2,2,4-trimethyl-1,3-pentanediol di-isobutyrate. These solvents are high molecular weight, and low in volatile organic compounds (VOCs). The discovery is surprising in that these solvents are not typically used in energy curable ink systems, and there is no prior reference actually showing the use of these solvents in such systems, especially as a viscosity/thixotropy reducer. Solvents are not normally used in energy curable inks because the press is not equipped with a long hot air oven to dry off solvents, and if solvents are in the ink formulation, residual solvents may remain in the ink. A further solvent that also showed surprising efficacy as a viscosity/thixotropy reducer in energy curable inks is dipropylene glycol butyl ether (DPGBE; mixed isomers). Each of these materials was tested in a finished ink or dispersion, with the object being to reduce the low shear rate viscosity of the inks or dispersions. Another unexpected result is that TXIB, and the other solvents, act as pigment dispersants at a very low level.

The compositions of the present invention, in addition to the aforementioned solvents, comprise materials typically found in energy curable ink systems. The ensuing paragraphs provides examples of these materials.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "compositions," "compositions of the invention," "inks and coatings," "inks," and "coatings" are used interchangeably, and refer to compositions of the invention, or, when specified, compositions found in the prior art (comparative). In the context of the present invention, "compositions" may also refer to dispersions, such as pigment dispersions. Inks and coatings typically contain resins, solvent, and, optionally, colorants. Coatings are often thought of as being colorless or clear, while inks typically include a colorant.

As used herein, "energy curing" and "radiation curing" refer to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used:

low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, "energy curable" and "radiation curable" refer to a composition that can be cured by exposure to one or more types of actinic radiation. Compositions of the current invention are especially suited for use in compositions curable under the action of UV light and/or electron-beam.

As used herein, "(meth)acrylate" and "(meth)acrylic acid" include both acrylate and methacrylate, and acrylic and methacrylic acid.

As used herein, "monofunctional" means having one functional group.

As used herein, "multifunctional" means having two or more functional groups. A multifunctional monomer, for example, can be di-functional, tri-functional, tetra-functional, or have a higher number of functional groups. The two or more functional groups can be the same or different. Unless specified otherwise, the two or more functional groups are the same, for example a compound having two or more functional acrylate groups.

As used herein, "monomer" refers to a small molecule having one or more functional groups. Monomers react with other monomers, either the same or different, to form monomer chains (oligomers and/or polymers). Each monomer in a chain is a monomer repeating unit. A monomer is the smallest unit that makes up an oligomer or a polymer. A monomer is a low molecular weight molecule, usually less than or equal to 100 Daltons weight average molecular weight (Mw).

As used herein, "oligomer" refers to a chain of a few monomer repeating units. Oligomers are a few to several monomer units long chains, and have a mid-range weight average molecular weight of about 100 Daltons to about 10,000 Daltons. Oligomers can be used as ink vehicles, and added monomers react with the oligomers to form polymers.

As used herein, "polymer" refers to a large molecule, containing multiple monomer and/or oligomer repeating units. Polymers are high molecular weight molecules, having a weight average molecular weight of greater than about 10,000 Daltons.

Energy Curable Compositions

The energy curable compositions of the present invention comprise one or more ethylenically unsaturated monomers, or one or more ethylenically unsaturated oligomers, or combinations thereof. The compositions of the invention comprise one or more solvents selected from the group consisting of: 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof. The compositions of the invention may be inks, coatings, or dispersions (e.g. pigment dispersions).

The radiation curable compositions of the present invention can be UV-cured by an actinic light source, such as for example UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 $mJ/cm^2$, and more preferably within a range of about 50 to 500 $mJ/cm^2$. In addition, the bulb can be appropriately selected according to the absorption spectrum of the radiation curable composition. Moreover, the inks of this invention can be cured under inert conditions. Inert conditions will mean the concentration of atmospheric oxygen is reduced or suppressed by nitrogen or some other gas to facilitate curing of the ink. Atmospheric oxygen can inhibit curing of radiation curable inks and coatings.

Alternatively, the radiation curable compositions and inks of this invention can be cured by electron beam (EB). Commercially EB-dryers are available for example from Energy Science, Inc. of Wilmington, Mass, or from Advanced Electron Beams Inc. (AEB) of Wilmington, Mass. The energy absorbed, also known as the dose, is measured in units of kiloGrays (kGy), one kGy being equal to 1,000 Joules per kilogram. Usually, the electron beam dose should be within the range of 10 kGy to about 40 kGy for complete curing. With the radiation curable composition of this invention a radiation dose of 20-30 kGy at an oxygen level of <200 ppm is usually sufficient to get a dry, solvent resistant coating or ink.

The energy curable compositions of the present invention contain low levels of 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof. Typically, the energy curable compositions of the present invention comprise about 0.5 wt % to about 3 wt % of one or more of these solvents, based on the total weight of the energy curable composition. The amount of solvents refers to the total amount of all of the solvents combined; that is, a maximum of 3 wt % of the combined solvents is included in the compositions of the present invention. Preferably, the energy curable compositions of the present invention comprise about 1 wt % to about 2 wt % total solvents.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2 (2-ethoxyethoxy)ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl) hexahydrophthalimide; N-butyl 1,2 (acryloyloxy)ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly(tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis [oxy (2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris(2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl caprolactam; N-vinyl oxazolidinone and N-vinyl pyrrolidone, and secondary or tertiary acrylamides such as N-acryloyl morpholine; diacetone acrylamide; N-methyl acrylamide; N-ethyl acrylamide; N-isopropyl acrylamide; N-t-butyl acrylamide; N-hexyl acrylamide; N-cyclohexyl acrylamide; N-octyl acrylamide; N-t-octyl acrylamide; N-dodecyl acrylamide; N-benzyl acrylamide; N-(hydroxymethyl) acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

The main classes of acrylated oligomers includes epoxy acrylates; urethanes acrylates; polyester acrylates; acrylic acrylates; hyperbranched polyester acrylates; waterborne UV polyurethane dispersions and, organic-inorganic hybrid materials.

The energy curable compositions of the present invention typically contain about 50 wt % to about 90 wt % ethylenically unsaturated monomers, ethylenically unsaturated oligomers, or a combination thereof. In some embodiments, the energy curable compositions contain about 60 wt % to about 80 wt % unsaturated monomers, ethylenically unsaturated oligomers, or a combination thereof, for example, about 65 wt % to about 75 wt %.

The radiation curable composition of the present invention may contain, inert, non-curable resins having no curable acrylic groups with a weight number average of 1000-30000 Daltons, preferred 1000-4000 Daltons, such as poly(acrylates), poly(ester), poly(urethanes), poly(amides) ketone resins, aldehyde resins, alkyd resins, phenol-formaldehyde resins, rosin resins, hydrocarbon resins, alkyd resins or mixtures of the aforementioned. Such resins improve pigment wetting, gloss, rheology, and flexibility. When present, the inert resins are typically present in an amount of about 5 wt % to about 20 wt %, based on the total weight of the composition.

The radiation curable compositions of the present invention may contain, if cured by UV light, photoinitiators. The photoinitiators may be used singly, or as a combination of two or more. When present, photoinitiators are typically present in an amount of about 5 wt % to about 30 wt %, based on the total weight of the composition.

There is no restriction on the type, blend or concentration of photoinitiator used and can include any suitable type of photoinitiators, such as, but not limited to: α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis [4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl) phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-methylthio)phenyl]-2-morpholinopropan-1- one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyl-diphenyl sulphide; 4-hydroxybenzophenone; 2,4,6-trimethyl benzophenone, 4,4-bis(diethylamino)benzophenone; benzophenone-2-carboxy (tetraethoxy) acrylate; 4-hydroxybenzophenone laurate; 1-[-4-[benzoylphenylsulpho]phenyl]-2-methyl-2-(4-methylphenylsulphonyl) propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl) oxime; [1-(4-phenylsulfanylbenzoyl)heptylideneamino]benzoate; [1-[9-ethyl-6-(2-methylbenzoyl) carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist, may also optionally be included in the formulation. Suitable examples include, but are not limited to: aromatic amines, such as 2-(dimethylamino) ethylbenzoate; N-phenyl glycine; benzoic acid, 4-(dimethylamino)-, 1,1'-[(methylimino)di-2,1-ethanediyl]ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGI-SYN 703, NeoRad P-81 and NeoRad P-85 all available from DSM-AGI.

Polymeric photoinitiators and sensitizers are also suitable, including, for example, polymeric aminobenzoates (GE-NOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

The energy curable compositions of the invention may comprise one or more colorants. Suitable colorants include but are not limited to: organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. When present, colorants are typically present in an amount of about 10 wt % to about 35 wt %, based on the total weight of the composition.

As with most ink and coating compositions, additives may be incorporated to enhance various properties. A partial list of such additives includes but is not limited to adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, etc. When present, the additives are each individually present in an amount of about 0.1 wt % to about 10 wt %.

Other additives are those traditionally used in energy curable compositions and inks, for example those that modify flow, surface tension, gloss and abrasion resistance of the cured coating or printed ink. These additives may function as leveling agents, in-can stabilizers, wetting agents, slip agents, flow agents, dispersants, and de-aerators. Preferred additives include fluorocarbon surfactants, silicones and organic polymer surfactants and inorganic materials such as talc. As examples, the Tegorad product lines (Tegorad are trademarks and are commercially available products of Tego Chemie, Essen, Germany) and the Solsperse product lines (Solsperse are trademarks and are commercially available products of Lubrizol Company).

When present, the additives are each individually present in an amount of about 0.1 wt % to about 5 wt %.

The radiation curable compositions and inks of this invention may contain the usual extenders such as clay, talc, calcium carbonate, magnesium carbonate or silica to adjust water uptake, misting and color strength. When present, the extenders are typically present in an amount of about 0.5 wt % to about 5 wt %.

EXAMPLES

The present invention is further described by the following non-limiting examples, which further illustrate the invention, and are not intended to, nor should they be interpreted to, limit the scope of the invention.

Methods

Viscosity

Viscosity was measured on an AR1000 rheometer, with the stage set at 25° C. a 4 cm/2° cone, and a shear rate ramp from 0 to 1000 sec$^{-1}$. The viscosity value is determined by dividing the shear stress value at 100 sec$^{-1}$ by the shear rate value at 100 sec$^{-1}$.

Example 1. Violet Dispersion Containing 2,2,4-trimethyl-1,3-pentanediol diisobutyrate (TXIB)

A violet pigment dispersion was modified by adding a small amount of 2,2,4-trimethyl-1,3-pentanediol diisobutyrate (TXIB). Table 1 shows the formulation of the modified violet dispersion, and Table 2 shows the formulation of the violet dispersion.

TABLE 1

| Example 1 violet dispersion modified with TXIB | |
|---|---|
| Material | wt % |
| Violet Dispersion[1] | 99 |
| TXIB | 1 |
| Total | 100 |

TABLE 2

| [1]Formulation details for violet dispersion | |
|---|---|
| Material | wt % |
| In-can stabilizer | 2 |
| Fatty acid modified hexaacrylate | 17 |
| Polyester hexaacrylate | 17 |
| Pigment dispersant | 8 |
| Alkoxylated triacrylate | 30 |
| Violet Pigment | 26 |
| Total | 100 |

As can be seen in the rheology curve of FIG. 1, the addition of 1% TXIB to a standard violet dispersion lowered the viscosity at 100 sec$^{-1}$ by approximately 44%, and resulted in a much more uniform flow pattern at low shear rates.

Example 2. Warm Red Ink Modified with TXIB

A standard warm red ink (NWUV-1670, Sun Chemical) was modified with 1% TXIB. The formulation of Example 2 warm red ink is shown in Table 3.

TABLE 3

| Example 2 warm red ink modified with TXIB | |
|---|---|
| Material | wt % |
| NWUV-1670 Ink | 99 |
| TXIB | 1 |
| Total | 100 |

Figure 2:
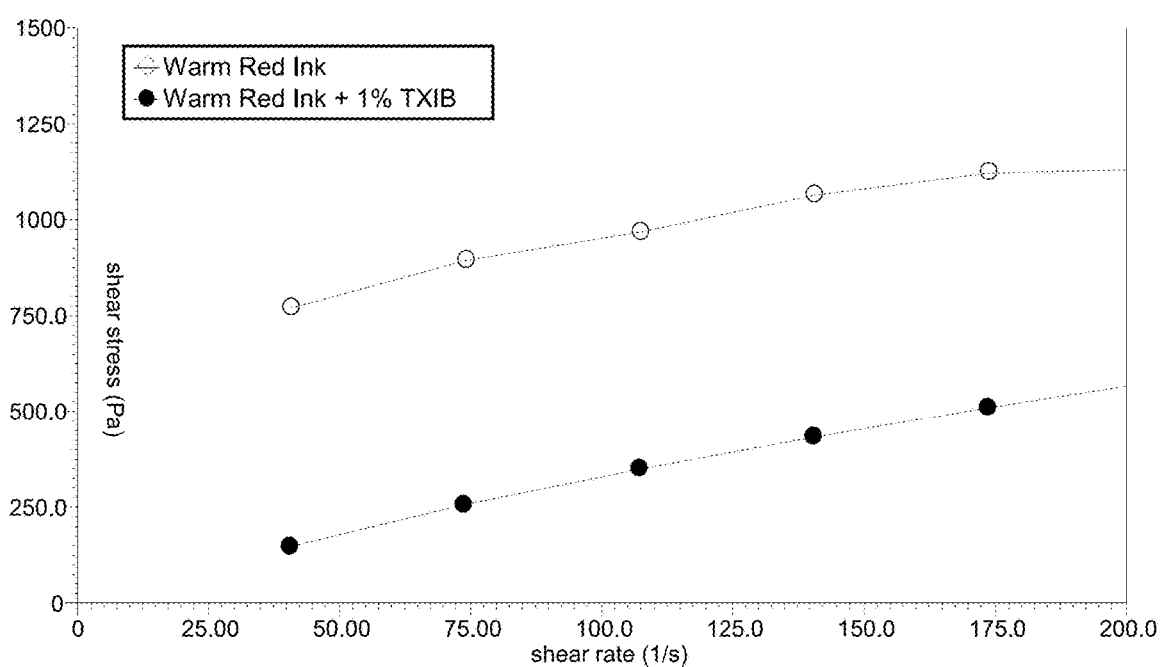
FIG. 2 illustrates the rheology curves for a warm red ink (NWUV-1670 UV flexographic ink, from Sun Chemical), and the same warm red ink modified with 1% TXIB, as described in Example 2.

As can be seen in the rheology curves in FIG. 2, 1% TXIB significantly reduced shear stress at low shear rates from 50 to 150 sec$^{-1}$ compared to the standard unmodified ink. The viscosity reduction at 100 sec$^{-1}$ was approximately 66%. In the box at the top of the curves are the viscosity values for each experiment at a shear rate of 100 sec$^{-1}$.

Examples 3 to 7. Blue Ink Modified with TXIB, Texanol, or DPGBE (Mixed Isomers)

A blue UV flexographic ink (blend of 75% NWUV-1606/ 25% NWUV-1488 from Sun Chemical) were modified with 1% TXIB, Texanol, or dipropylene glycol butyl ether (DPGBE mixed isomers). TXIB and Texanol were also tested at a 2% level. The formulations of Examples 3 to 7 are shown in Table 4.

TABLE 4

| Formulations of Examples 3 to 7 blue ink | | | | | |
|---|---|---|---|---|---|
| | Example 3 (wt %) | Example 4 (wt %) | Example 5 (wt %) | Example 6 (wt %) | Example 7 (wt %) |
| NWUV-1606:NWUV-1488 75:25 Blue Ink | 99 | 99 | 99 | 98 | 98 |
| TXIB | 1 | 0 | 0 | 2 | 0 |
| DPGBE [mixed isomers] | 0 | 1 | 0 | 0 | 0 |
| Texanol | 0 | 0 | 1 | 0 | 2 |
| Total | 100 | 100 | 100 | 100 | 100 |

Figure 3:
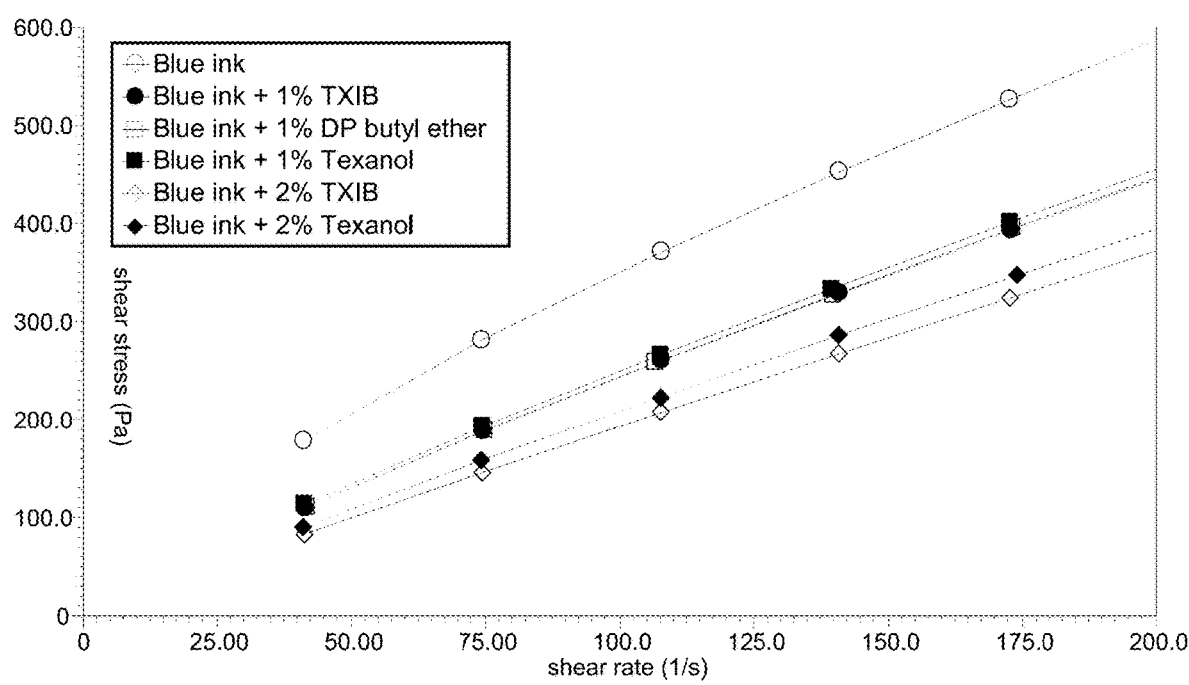
FIG. 3 illustrates the rheology curves for a blue ink (NWUV-1606: NWUV-1488, 75:25 from Sun Chemical) modified with varying amounts of TXIB, Texanol, and DPGBE, as described in Examples 3 to 7.

As can be seen in the rheology curves in FIG. 3, all of the solvent materials tested reduced the low shear rate shear stress of the blue ink (open circle curve represents the control unmodified blue ink). The modification that reduced low shear rate shear stress most is 2% TXIB (open diamond curve). The reduction in viscosity with 2% TXIB at 100 sec$^{-1}$ was approximately 40%.

As demonstrated in this work, TXIB, Texanol, and DPGBE were able to reduce thixotropy for systems with high viscosity at low shear rates. For other systems that are experiencing pumping or low shear rate flow problems using TXIB, Texanol, or DPGBE could result in better flow. Depending on the system and initial low shear rate viscosity, the amount of TXIB, Texanol, or dipropylene glycol butyl ether (DPGBE mixed isomers) needed to reduce viscosity and thixotropy will typically be between 0.5-3% of the formula.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An energy curable composition, comprising:
   (a) 50 wt % to 90 wt %, based on the total weight of the composition, of one or more ethylenically unsaturated monomers, or one or more ethylenically unsaturated oligomers, or combinations thereof; and
   (b) 0.5 wt % to 3 wt %, based on the total weight of the composition, of one or more solvents selected from the group consisting of: 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof; wherein the amount of solvent refers to the total amount of all the solvents combined;
   wherein the viscosity is reduced by equal to or greater than 20%, compared to a composition containing all of the same components except the solvent;
   wherein the energy curable composition is curable at a UV energy dose of 30 to 1000 mJ/cm$^2$; and
   wherein energy curable refers to the cure achieved under exposure to electromagnetic sources producing an actinic effect.

2. The composition of claim 1, further comprising one or more colorants.

3. The composition of claim 1, further comprising one or more photoinitiators.

4. The composition of claim 1, wherein the composition is a printing ink, coating, or pigment dispersion.

5. The composition of claim 1, wherein the composition is an energy curable flexographic ink.

6. The composition of claim 1, wherein the viscosity is reduced by equal to or greater than 25%, compared to a composition containing all of the same components except the solvent.

7. The composition of claim 1, wherein the viscosity is reduced by equal to or greater than 30%, compared to a composition containing all of the same components except the solvent.

8. The composition of claim 1, wherein the viscosity is reduced by equal to or greater than 35%, compared to a composition containing all of the same components except the solvent.

9. The composition of claim 1, wherein the viscosity is reduced by equal to or greater than 40%, compared to a composition containing all of the same components except the solvent.

10. A method of reducing the viscosity of an energy curable composition, comprising:
    (a) providing an energy curable composition;
    (b) adding 0.5 wt % to 3 wt %, based on the total weight of the composition, of one or more solvent selected from the group consisting of: 2,2,4-trimethyl-1,3-pentanediol isobutyrate (Texanol); 2,2,4-trimethyl-1,3-pentanediol diisobutyrate (TXIB); dipropylene glycol butyl ether (DPGBE mixes isomers); and blends thereof; wherein the amount of solvent refers to the total amount of all the solvents combined; and wherein the viscosity is reduced by equal to or greater than 20%, compared to a composition containing all of the same components except the solvent.

11. The method of claim 10, wherein the composition is a flexographic ink.

12. A printed article comprising the composition of claim 1.

13. The article of claim 12, wherein the article is a printed label.

14. The energy curable composition of claim 1, wherein the energy curable composition is curable at a UV energy dose of 50 to 500 mJ/cm$^2$.

* * * * *